(12) United States Patent
Cheng et al.

(10) Patent No.: US 11,153,149 B2
(45) Date of Patent: *Oct. 19, 2021

(54) SYSTEM AND METHOD FOR PROACTIVE DISTRIBUTED AGENT BASED NETWORK DIAGNOSIS

(71) Applicant: International Business Machines Corporation, Armonk, NY (US)

(72) Inventors: Chia-Le Cheng, Southport (AU); Jason Chorley, Southport (AU); Jevon J. C. Hill, Southport (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,891

(22) Filed: Jan. 29, 2020

(65) Prior Publication Data

US 2020/0169453 A1 May 28, 2020

Related U.S. Application Data

(63) Continuation of application No. 15/825,442, filed on Nov. 29, 2017, now Pat. No. 10,608,868.

(51) Int. Cl.
*G06F 11/00* (2006.01)
*H04L 12/24* (2006.01)
(Continued)

(52) U.S. Cl.
CPC ...... *H04L 41/0631* (2013.01); *G06F 11/0709* (2013.01); *G06F 11/079* (2013.01);
(Continued)

(58) Field of Classification Search
CPC . G06F 11/079; G06F 11/2294; G06F 11/0709
See application file for complete search history.

(56) References Cited

U.S. PATENT DOCUMENTS 5,490,209 A 2/1996 Kennedy
5,796,953 A 8/1998 Zey
(Continued)

OTHER PUBLICATIONS

M. El-Darieby et al., Intelligent Mobile Agents: Towards Network Fault Management Automation, Integrated Network Management, 1999, Proceedings of the Sixth IFIP/IEEE International Symposium on Distributed Management for the Networked Millennium, May 24-28, 1999.
(Continued)

*Primary Examiner* — Charles Ehne
(74) *Attorney, Agent, or Firm* — Terrile, Cannatti & Chambers, LLP; Michael Rocco Cannatti

(57) ABSTRACT

A method, system, and apparatus are provided for diagnosing network faults by distributing network test policies to remote devices that issue network tests and report network test results from a first remote device which attempts to access a first network resource over a first specified network path, where a central portal responds to a first network test result by issuing a command to one or more additional remote devices to issue one or more additional network tests for evaluating at least part of the first specified network path and report network verification test results having data which is aggregated with data from the first network test result report for use in proactively diagnosing the network fault in the first specified network path.

20 Claims, 3 Drawing Sheets

(51) Int. Cl.
  *H04L 12/26* (2006.01)
  *G06F 11/07* (2006.01)
  *G06F 11/22* (2006.01)

(52) U.S. Cl.
  CPC ...... *G06F 11/2294* (2013.01); *H04L 41/0618* (2013.01); *H04L 41/0677* (2013.01); *H04L 43/0817* (2013.01); *H04L 43/50* (2013.01); H04L 41/046 (2013.01); H04L 43/0823 (2013.01)

(56) References Cited

U.S. PATENT DOCUMENTS

| | | |
|---|---|---|
| 6,460,070 B1 | 10/2002 | Turek |
| 8,768,339 B2 | 7/2014 | Yang |
| 9,274,902 B1 | 3/2016 | Morley |
| 9,286,471 B2 | 3/2016 | Qureshi |
| 2010/0100767 A1 | 4/2010 | Liu |
| 2011/0167497 A1 | 7/2011 | Van De Groenendaal |
| 2011/0282607 A1* | 11/2011 | Tunell .................... G01R 31/60 702/65 |
| 2014/0280913 A1 | 9/2014 | Karren |
| 2015/0242294 A1* | 8/2015 | Lapierre ............... G06F 11/079 714/37 |

OTHER PUBLICATIONS

List of IBM Patents or Applications Treated as Related, 2020.

* cited by examiner

SYSTEM AND METHOD FOR PROACTIVE DISTRIBUTED AGENT BASED NETWORK DIAGNOSIS

BACKGROUND OF THE INVENTION

Field of the Invention

The present invention is directed in general to the field of distributed computer enterprise networks. In one aspect, the present invention relates generally to a system and method for diagnosing network faults in such networks using mobile devices.

Description of the Related Art

As computing resources are deployed in large, geographically-dispersed network systems, organizations and individuals increasingly rely on the correct behavior of the network systems. However, there are challenges with maintaining network reliability and quality of service with the trend toward more heterogeneous networks in today's communications environment. Such network diversity results not only from the complexity and size of the network topology, but also from the variety of different network-connected computers and mobile devices, such as smartphones, tablet computers, laptops and desktop computers, that are in widespread use. An additional factor in network diversity is the security and communication network components (such as relays, firewalls, load balancers, gateways, proxies, etc.) which are required to support secure access over the network to business resources (e.g., online retail businesses). When one or more of these network components is misconfigured or unresponsive, it can cause a range of symptoms, including vague error messages to the mobile device user and/or specific or general error messaging in network component logs for the network administrator to evaluate.

Unless dedicated monitoring software/hardware is available, the administrator typically learns about a network problem as it is reported by the mobile device user, at which point the administrator must check the log files of what they think are the problematic network components in the chain of the problematic network components. Quite often, the network problem reporting mechanism is implemented by installing software agents or monitors on each networked device to perform an internal evaluation of the device performance. However the network reports are generated, the administrator may respond to a network problem by attempting to replicate the issue using the admin's mobile device(s), by running a multitude of tests using generic network diagnostic tools, and/or executing other actions to gather more information with the goal of finding and resolving the responsible network component(s) that are causing the issue. This reactive admin process of network diagnosis also extends to support teams and developers when the issue escalates. As a result of the growing network complexity, the ability to manage these diverse networks requires that network operators must have greater knowledge and increased training, as well as large quantities of data from the network that must then be analyzed before management activity can be initiated.

As seen from the foregoing, the existing network diagnosis solutions are extremely difficult at a practical level by virtue of not only the complexity of diagnosing an particular network issue and costs associated with conventional solutions, but also the fact that network diagnosis by the administrator is often a delayed reaction to a network issue, especially when a network administrator must see the report reported by the mobile device to a central server and then assess the report and decide on the best action to take before executing the actions to gather more information or resolve the issue.

SUMMARY

Broadly speaking, selected embodiments of the present disclosure provide a system, method, and apparatus for using a distributed network of managed devices to proactively diagnose network problems with an information handling system that periodically specifies and distributes network test policies to remote managed devices, monitors network issue reports from remote devices, and issues network test commands to selected remote devices pursuant to specified network test policies so that the selected remote devices can perform tests to verify the reported network issues using specified criteria and report test results to assist with network diagnosis. In selected embodiments where the information handling system embodies a network administrator portal computing system which uses mobile device management (MDM) techniques to administer the uses of a plurality of mobile devices, the administrator and SaaS support may specify network test policies in terms of the content and frequency of network tests to be performed by which mobile devices to monitor the network performance, as well as the content and frequency of reactive or verification network tests to be performed by which mobile devices in response to a reported network issue. By periodically or continuously issuing network tests to the mobile devices in the MDM network, the administrator portal works with the mobile devices to proactively perform network diagnosis responding to network issues reported by a mobile device with commands to one or more additional mobile devices to perform reactive or verification network tests to evaluate the reported network issue. With the additional test results reported back, the network administrator portal may be configured to automatically transform the test results for displays into an aggregated report for the administrator to view in support of network diagnosis. In selected embodiments, the aggregated report may contain a census of data which the network administrator can use to determine if the problem is global to all mobile devices, or to a subset of the mobile devices. This consensus of testing results provides value where remote mobile devices (such as in an MDM environment) can have varying levels of network connectivity quality and the source of their connections will come from different geographic areas. In accordance with selected embodiments of the present disclosure, a proactive network diagnosis solution is provided which enables remote agents that encounter network issues to have the ability to ask other remote agents to help verify the network issue and report the results, thereby automating a portion of the network diagnostic process via a centrally defined and distributed set of network test policies.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
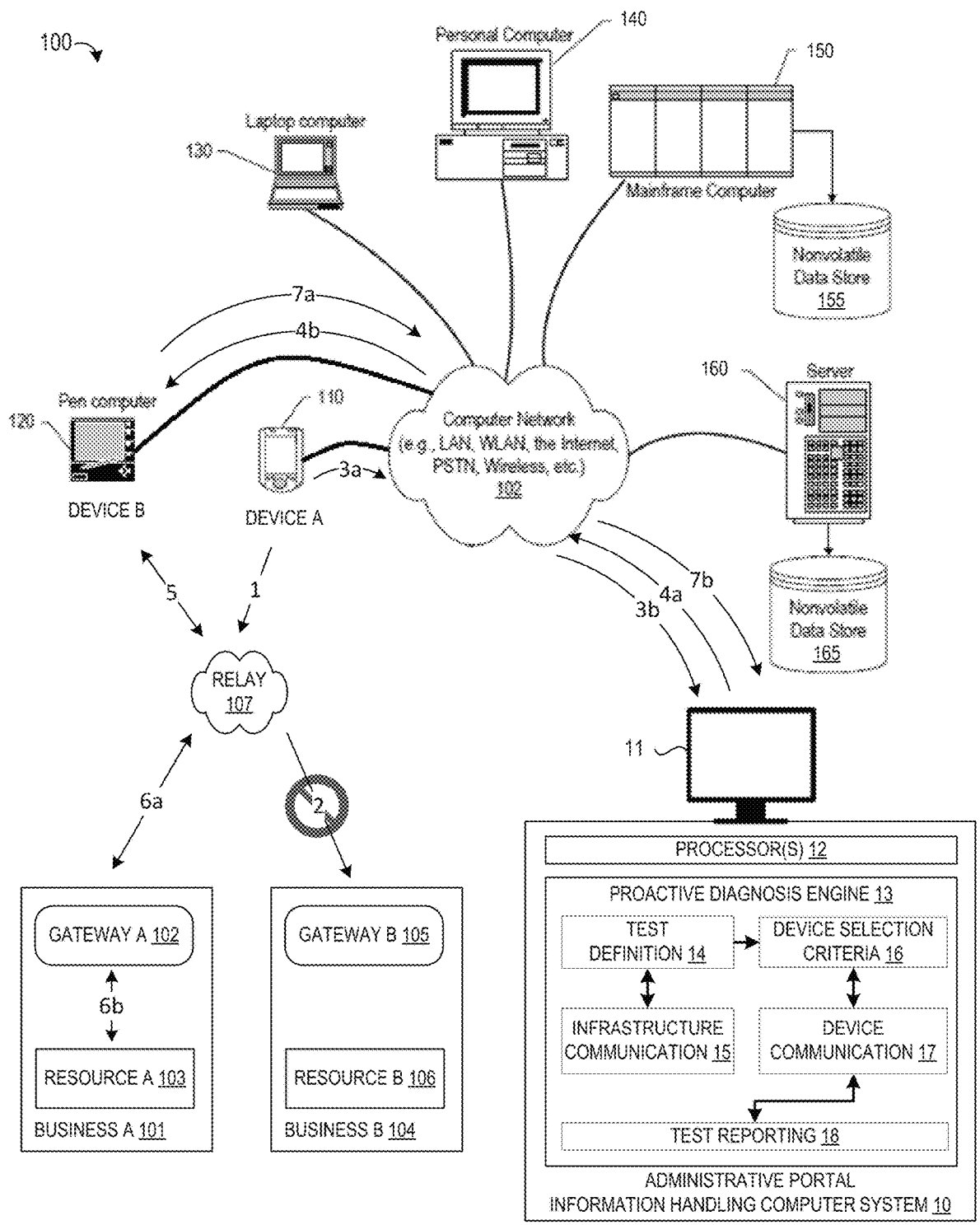
FIG. 1 depicts a network environment that includes an administrative portal information handling system and a plurality of remote devices to proactively perform network diagnosis in accordance with selected embodiments of the present disclosure.

The present invention may be a system, a method, and/or a computer program product. In addition, selected aspects of the present invention may take the form of an entirely hardware embodiment, an entirely software embodiment (including firmware, resident software, micro-code, etc. or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a large distributed computer network 100 comprising up to thousands of "nodes" that may be geographically dispersed. The nodes will typically be "managed" in a distributed manner, such as by dividing the network 100 into a series of loosely-connected managed regions (MR), each with its own management server for managing local resources with the MR. The network typically will include other servers (not shown) for carrying out other distributed network functions. These include name servers, security servers, file servers, threads servers, time servers and the like. While one or more servers may be used to coordinate activities across the enterprise and permit remote site management and operation, the depicted network 100 includes an administrative portal information handling computer system 10 which uses a proactive diagnosis engine 13 which deploys a plurality of remote devices (e.g., 110, 120) which are connected and configured to proactively perform network diagnosis in respect of network communications to one or more networked nodes (e.g., 101, 104). To this end, the administrative portal information handling computer system 10 ("portal") uses a proactive diagnosis engine 13 that includes a test definitions module 14 which specifies one or more test policies in terms of the what network tests will be performed, when and/or how frequently the network tests will be performed, which remote devices will perform the network tests for purposes of monitoring the network performance and/or in response to a reported network issue. The proactive diagnosis engine 13 may also include an infrastructure communications module 15 which specifies network infrastructure information for network nodes known to the portal 10. In addition, the proactive diagnosis engine 13 may include a device selection criterial module 16 which specifies which of the remote devices are to carry out the network tests, where device selection may be limited by the test specified in the test definition module 14 and by the criteria defined for what remote devices should carry out the test. To communicate the network tests to the remote devices, the proactive diagnosis engine 13 may use the device communication module 17 to form the payload of network tests to send to the selected remote device(s) to carry out the network test(s). In addition, the device communication module 17 may also receive network test results back from the remote devices, and then use the test definition module 14 to carry out further tests by other remote devices for purposes of verifying or otherwise testing any reported network issues. To process network test results received back from the selected remote device(s), the proactive diagnosis engine 13 uses the test reporting module 18 to transform the network test results for display to the network administrator to assist with network diagnosis.

As illustrated, the portal 10 is connected over the network 102 to communicate with one or more computing devices (e.g., 110, 120, 130, 140, 150, 160), including a plurality of network resource service (e.g., 101, 104) that are connected via one or more wired and/or wireless data communication links 107, where each communication link may comprise one or more of wires, routers, switches, transmitters, receivers, or the like. In this networked arrangement, the distributed computer network 100 may enable each networked device 10, 101, 104, 110, 120, 130, 140, 150, 160) to communicate with one another over the network 102 and relay elements 107, alone or in combination with components, systems, sub-systems, and/or devices other than those that are depicted herein. Thus, the network 102 may include local network connections and remote connections in various embodiments, such that the portal 10 may operate in environments of any size, including local and global, e.g., the Internet. In this environment, the portal 10 may serve as a Mobile Device Management (MDM) platform to manage devices and enforce corporate security policy, including performing policy compliance assessments, device wipes, application management, and device lockdowns.

To support the MDM platform, each managed mobile device (e.g., 110, 120, 130) may install an agent or mobile application to provide managed agent functionality in accordance with the present disclosure. For example, an embedded agent device (e.g., 110) may run software that enables self-management capabilities, such as password for user authentication, automatic locking if the device is idle for a certain period of time, anti-virus software and signature updates, auto wipe or erasing of data after a certain number of failed password attempts, self-service to remotely lock, locate, or wipe sensitive enterprise data on a device if stolen or lost securing sensitive enterprise data by using, for example, encryption, containerization, or virtualization, configuration restrictions and patch level check, checks on jail-breaking or rooting the device, application blacklisting or white listing with the capability to un-enroll devices in the event a vulnerability is detected, and monitoring, alerting, and tracking policy violations and access to certain applications. In addition, an embedded agent device (e.g., 110) may run software that enables the administrator portal 10 to manage the agent device to access corporate resources (e.g., 101, 104) via network infrastructure 102, 107 of the MDM platform and/or business using one or more policy-specified network tests. At the central portal 10, the MDM platform may be implemented with tools for remote administration of several functions, such as device enrollment, provisioning of users, asset management, patch management, software distribution, software upgrades, and audit and compliance reporting. A representative MDM platform of this type is IBM® Endpoint Manager for Mobile Devices, also known as IBM MaaS360.

In addition to the MDM platform functionality, the portal 10 includes tools which enable proactive diagnosis of network issues that are discovered and verified by the embedded agent devices. In particular, the proactive diagnosis engine 13 includes tools to specify, distribute, and coordinate network tests by agent devices (e.g., 110, 120), to assemble the network test responses, to perform any further network tests, and/or to present a report of the testing results to the network administrator (determined by policy) at the portal console 11. With the network test functionality distributed across the portal 10 and the managed remote devices (e.g., Device A 110 and Device B 120), any failed attempts by a remote device to connect to a network resource 106 can be reported back as a network error to the administrator portal 10 for further processing and evaluation.

Consider the simple scenario where a first managed remote device (e.g., Device A 110) makes a request to access a network resource (e.g., Resource B 106), where the request may be issued by a user of the device 110 or by a network testing policy installed at the device 110. In this scenario, the resource request is sent over a first link (path "1") to the network relay element 107 before traversing any internal communication network components 105 (e.g., Gateway B) at the business network (Business B 104) where the requested network resource 106 is located. If the connection (path "2") from the network relay element 107 to the internal network component 105 fails or times out, the distributed nature of the network components 107, 105 prevents the first managed remote device 110 from determining which communication links ("1" or "2") are preventing the connection. In the event of such an network access failure, the first managed remote device 110 automatically reports the network issue to the administrator portal 10 by sending a network issue report to the portal 10 via the network 102 (path "3a" and "3b"). In the network issue report, the first managed remote device 110 may specify the nature of the resource request and response, along with information identifying the neighboring network component (e.g., 107) through which the request was sent. With this reporting scheme, there is no requirement that requested resource 106 have any installed software for internally assessing its connectivity issues. Instead, the first managed remote device 110 will use authorized and secure access to the network 100 to automatically send network issues reports that provide information regarding its connectivity between its neighboring network components without requiring any special knowledge about the network topology and without requiring direct network administrator access.

Upon receiving a network issue report (via path "3"), the administrator portal 10 issues one more additional network tests to one or more managed remote devices (e.g., Device B 120) for purposes of proactively testing or verifying the connectivity issues identified in the network issues report. For example, the portal 10 may issue a command via the network 102 (path "4a" and "4b") to a second managed remote device 120 (Device B) which issues an additional network test to a different network resource (e.g., Resource A 103) through the neighboring network component (e.g., 107) identified in the network issue report. In selected embodiments, either or both of the additional network test(s) and issuing remote device(s) are determined by an administrator-defined policy that is installed at the administrator portal 10 and/or the remote devices (e.g., Device B 120). In an example network test, the second managed remote device (Device A 120) attempts to access a second network resource (e.g., Resource A 103) at the business network (Business a 101) which has its own internal communication network components 102 (e.g., Gateway A) using the same relay component 107 identified in the network issue report. If the resource request is successfully sent over a first link (path "5") to the network relay element 107 and over a second link (path "6a" and path "6b") traversing the internal communication network component 102 (e.g., Gateway A) where the requested network resource 103 is located, then the second managed remote device 120 automatically reports the results by sending a network verification report to the portal 10 via the network 102 (path "7a" and "7b"). In the network verification report, the second managed remote device 120 may specify the nature of the resource request and response result, along with information identifying the neighboring network component (e.g., 107) through which the request was sent.

In response to the network verification report, the portal 10 may perform additional network tests using other managed remote devices to further evaluate or verify the network connectivity issues reported by the first managed remote device (e.g., Device A 110). In addition or in the alternative, the portal 10 may assemble the network test results into an aggregated report for the network administrator to view at the display 11. When a report is presented, the support team can see that another device (e.g., Device B 120) was able to make a successful request via the Relay network component 107, thereby narrowing the problem to Gateway B 105 having a potential issue. As will be appreciated, the more remote devices that run network tests and report results to the portal 10, the more data is provided about the status of the relay 107. For example, an additional network test can be run by the first managed remote device (Device A 120) to test access the second network resource (e.g., Resource A 103) at the business network (Business a 101) using the same relay component 107 identified in the original network issue report, with any successful connection indicating that there are no network issues with relay 107.

Types of information handling systems that can be used to proactively diagnose network issues range from small handheld devices, such as a handheld computer/mobile telephone 110 to large mainframe systems, such as mainframe computer 160. Examples of handheld computer 110 include personal digital assistants (PDAs), personal entertainment devices, such as MP3 players, portable televisions, and compact disc players. Other examples of information handling systems include a pen or tablet computer 120, laptop or notebook computer 130, personal computer system 140, or even a mainframe computer 150 or server 160. As shown, the various information handling systems can be networked together using computer network 102. Types of computer network 102 that can be used to interconnect the various information handling systems include Local Area Networks (LANs), Wireless Local Area. Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 150 utilizes nonvolatile data store 155). The nonvolatile data store can be a component that is external to the various information handling systems or can be internal to one of the information handling systems.

In accordance with selected embodiments of the present disclosure, the disclosed system and method for proactive network diagnosis is implemented in an enterprise environment where a set of MDM agents located at a plurality of network locations are configured with test policies to signal network faults or errors and to perform policy-specified network tests. The MDM agents are "mobile" in the sense that the agents are dispatched with administrator-specified test policies and then migrate throughout the network environment as managed agents which and can issue network tests without requiring access to the network endpoints being tests and without requiring the installation of specific network diagnosis agents for specific customers and their infrastructure. In this way, the mobile MDM agents traverse the network to perform network tests from a variety of different environments to help determine problem areas once an issue is found for assistance with diagnosing and, if possible, correcting a network fault or at least assisting in correcting network faults with the information sent back to the portal. Thus, when a first mobile MDM agent reports a network error or "fault" whose cause and location are not apparent or readily ascertainable, one or more additional mobile MDM agents are automatically triggered to issue additional network tests to verify the same network issue using the same or different set of tests. Thus, instead of dispatching or installing test software at the actual node in the network at which the fault condition occurs, the particular error is identified by deploying mobile MDM agents having authorized and secure access to the network to issue additional network tests that can externally evaluate the location of the network node where the fault condition exists.

Figure 2:
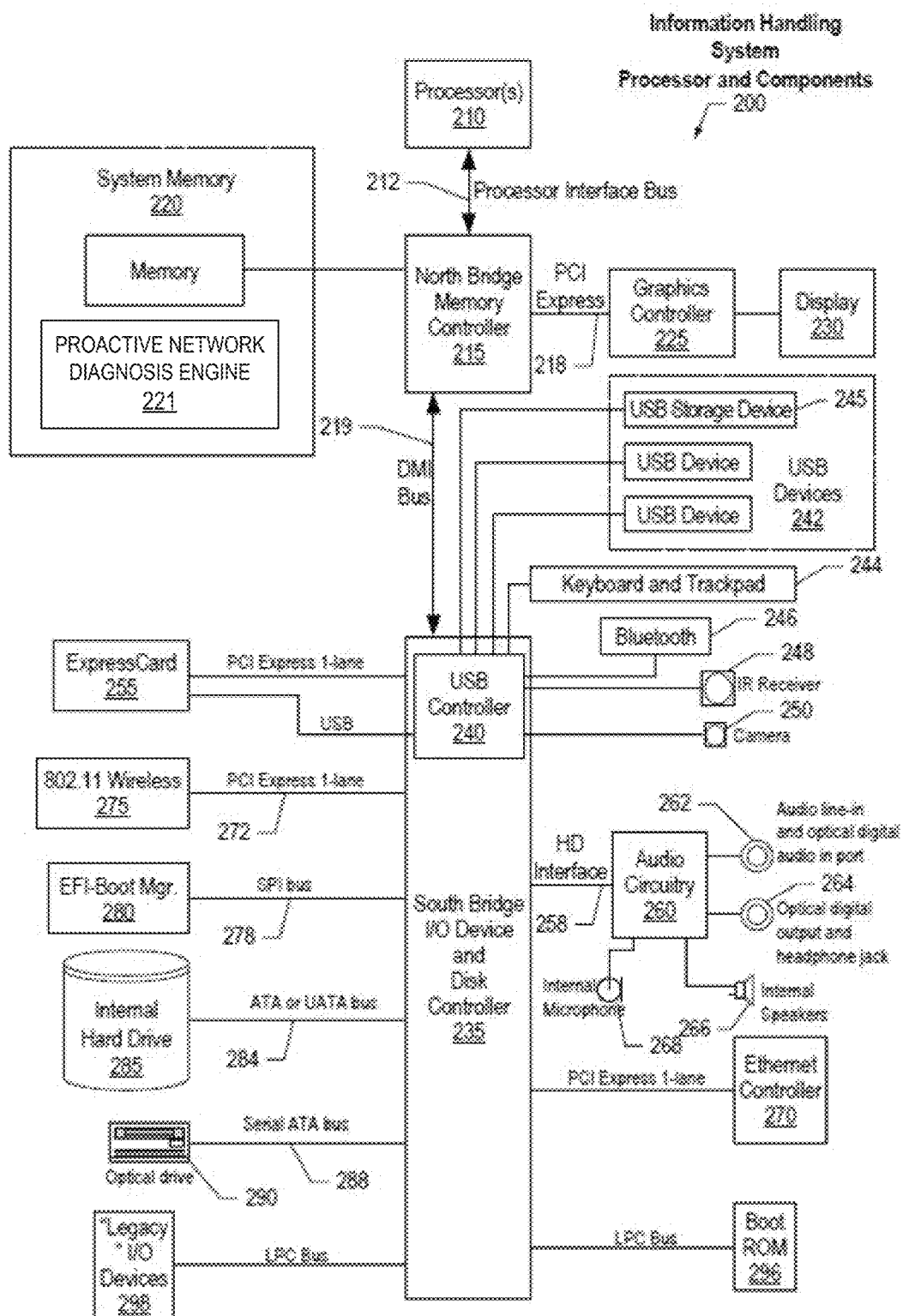
FIG. 2 is a block diagram of a processor and components of an information handling system such as those shown in FIG. 1.

FIG. 2 illustrates an illustrative example of an information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a proactive network diagnosis engine module 221 which may be invoked to manage a distributed network of remote devices by periodically specifying and distributing network test policies, monitoring network issue reports from remote devices, and issuing network test commands to selected remote devices pursuant to specified network test policies so that the selected remote devices can perform tests to verify the reported network issues using specified criteria and report test results to assist with network diagnosis. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) and the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one example configuration for an information handling system 200, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
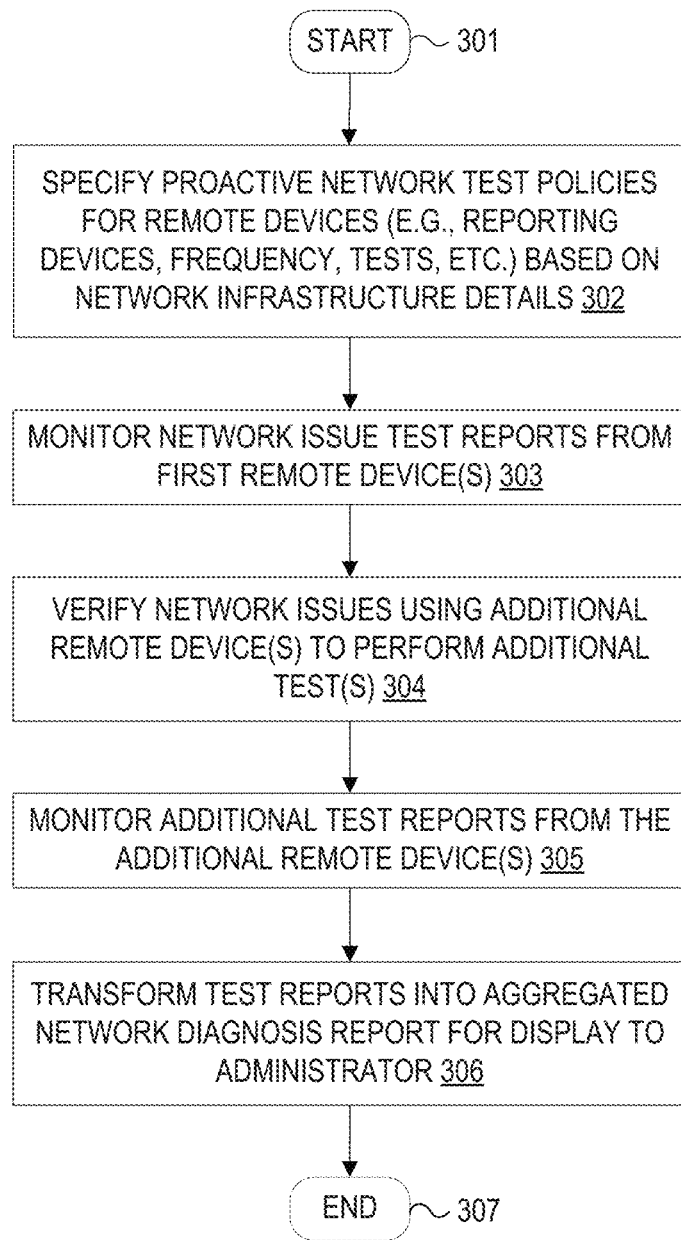
FIG. 3 illustrates a simplified flow chart showing the logic for proactively diagnosing network problems using a plurality of managed mobile devices as distributed network agents in accordance with selected embodiments of the present disclosure.

To provide additional details for an improved understanding of selected embodiments of the present disclosure, reference is now made to FIG. 3 which depicts a simplified flow chart 300 showing the logic for proactively diagnosing network problems using a plurality of managed mobile devices as distributed network agents. The processing shown in FIG. 3 may be performed in whole or in part by an information handling system, such as the administrative portal information handing system 10 or other suitable mobile device management system or software architecture for managing a distributed network of remote devices to proactively diagnose network problems.

FIG. 3 processing commences at 301 which may occur during when a network administrator creates or implements a mobile device management MDM platform. In the ensuring method steps 302-306, the MDM functionality may be embodied in whole or in part in a proactive network diagnosis tool at a central portal device that manages the distribution and execution of network tests performed by client devices having authorized and secure network access so that there is no requirement of a dedicated architecture inside the network. As explained below, the proactive diagnosis tool checks for network issues by using the externally generated network tests from client devices to proactively provide diagnostic level of information using the method(s) described as follows.

At step 302, proactive network test policies for remote devices are specified and deployed. In selected embodiments, a network administrator may use a central portal to specify network test policies and criteria in terms of the content and test frequency of network tests to be performed a remote device. For example, the policy may specify which devices perform network tests, what network tests are performed, how frequently the remote devices execute network tests, and/or whether the network tests are to be manually triggered at the remote device. The policy may also specify what network tests are performed in reaction to a reported network issue. In identifying which remote devices should perform which network tests, the administrator-specified policy may use selected test definition criteria, such as the network infrastructure than can be accessed by the remote device. As disclosed herein, the policy specification processing at step 302 may be performed at portal 10 or proactive diagnosis engine 13 which uses the test definition module 14 to specify the content and frequency of the network tests, and which uses the infrastructure communication module 15 to specify the granularity of the network tests for a remote device based the network infrastructure than can be accessed by the remote device. In addition, the portal 10 may use the device selection criteria module 16 to specify which remote devices will perform the network tests, and may then assemble and send the network test payload to the selected devices using the device communication module 17.

At step 303, the selected remote devices issue network issue test reports after executing their respective network tests in accordance with the administrator-specified policies, with the issued reports being received and/or monitored at a central location. For example, a network issue test report from a first remote device (e.g., Device A 110) may identify the network issue in terms of information identifying the first remote device, the specified resource request and result (success or failure), and information identifying the adjacent network component(s) (e.g., relay 107) which was able to receive the resource requests. In selected embodiments, the test report monitoring at step 303 may be performed at portal 10 or proactive diagnosis engine 13 which uses the device communication module 17 to listen for network issues from remote devices (e.g., Device A 110) which attempt to access a network resource (e.g., Resource B 106) over the network relay 107.

At step 304, the identified network issues are verified or otherwise tested using one or more additional remote devices which perform additional network tests in accordance with the administrator-specified policies. For example, an administrator may respond to the network issue test report from the first remote device by manually executing one or more additional network tests to verify the test issue. Alternatively, the central portal 10 may automatically issue the additional test(s) to the additional remote device(s) which execute the additional test(s) to verify the test issue originally identified in the network issue test report from the first remote device. In selected embodiments, the verification test processing at step 304 may be performed at portal 10 or proactive diagnosis engine 13 which uses the device communication module 17 to issue commands to the additional remote device(s), using a set of criteria in the specified test policies, to test the reported network issue.

Once the additional remote device(s) perform the requested additional network tests, the test results are reported back to the central portal which monitors the results at step 305. For example, multiple remote devices (e.g., Device A 110 and Device B 120) may each perform additional network tests by attempting to access another network resource (e.g., Resource A 103) over the network relay 107. In selected embodiments, the additional test report monitoring at step 305 may be performed at portal 10 or proactive diagnosis engine 13 which uses the device communication module 17 to listen for additional test reports from the additional remote devices. If necessary, the processing at steps 304 and 305 may be repeated one or more times in an iterative loop until sufficient the additional test reports provide a census of data which the network administrator can use to diagnose the type and extent of the network issue (e.g., is the problem global to all remote devices or to only a subset of devices). The accumulated consensus of testing results is important since the remote devices can have varying levels of network connectivity quality, and the source of their connections will come from different geographic areas.

Once the additional test report results are reported back to the central server, they may be transformed into an aggregated network diagnosis report for display and review by the network administrator at step 306. For example, when an aggregated network diagnosis report is presented, the support team can see that a first remote device (e.g., Device A 110) was not able to make a successful request via the relay network component 107 when attempting to access a first network resource (e.g., Resource B 106), but another device (e.g., Device A 110) was able to make a successful request to access another network resource (e.g., Resource A 103) via the relay network component 107. This narrows down the network issue problem to Gateway B 105 having a potential issue. In selected embodiments, the network diagnosis test report processing at step 306 may be performed at portal 10 or proactive diagnosis engine 13 which uses the test reporting module 18 to transform the test report data to be presented to the administrator. And at step 307, the process ends.

By now, it will be appreciated that there is disclosed herein a system, method, apparatus, and computer program product for proactively diagnosing network faults in a distributed computer network with an information handling system having a processor and a memory. As disclosed, the system, method, apparatus, and computer program product distributes network test policies to remote devices, each network test policy including network test instructions for the remote device to issue network tests and report network test results. In selected embodiments, the network test policies are distributed by periodically issuing network tests to the remote devices which may be mobile devices that are managed by a mobile device management platform. In addition, each network test policy specifies one or more network tests to be performed by the remote device in terms of network test content and frequency. The system subsequently receives a first network test result report from a first remote device which attempts to access a first network resource over a first specified network path. In selected embodiments, the first network test result report may include information specifying a first network component in the first specified network path that was successfully reached by the first remote device attempt to access the first network resource. In response to a network test result report, the system issues a command to instruct at least a second remote device to issue a network test for evaluating at least part of the first specified network path and report network verification test results pursuant to any network test policy stored at the second remote device. For example, the issued command may instruct the second remote device to issue a second network test along a second specified network path which overlaps with the first specified network path at the first network component. In selected embodiments, the remote devices have authorized and secure access to the distributed computer network to issue network tests that can externally evaluate a location of the network fault in the distributed computer network. Finally, the system aggregates data from the first network test result report and network verification test results for use in proactively diagnosing the network fault in the first specified network path.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for proactively diagnosing a network fault in a distributed computer network, the method comprising:

receiving, by the system, a first network test result report from a first remote device which attempts to access a first network resource over a first specified network path, where the first network test result report identifies a first network issue with information identifying a first resource request to the first remote device, a received response from the first remote device, and information identifying one or more neighboring network components through which the first resource request was sent;

issuing, by the system, a command to at least a second remote device in response to the first network issue identified in the first network test result report, where the command instructs at least the second remote device to issue a network test for evaluating at least part of the first specified network path and report network verification test results pursuant to a network test policy stored at the second remote device, where the command is based on network test policies and device selection criteria specifying which remote devices perform what network tests in reaction to a reported network issue; and aggregating, by the system, data from the first network test result report and network verification test results for use in proactively diagnosing the network fault in the first specified network path.

2. The method of claim 1, where the plurality of remote devices comprises a plurality of mobile devices that are managed by a mobile device management platform.

3. The method of claim 1, where each network test policy at a remote device specifies one or more network tests to be performed by the remote device in terms of network test content and frequency.

4. The method of claim 1, where the plurality of remote devices have authorized and secure access to the distributed computer network to issue network tests that can externally evaluate a location of the network fault in the distributed computer network.

5. The method of claim 1, further comprising distributing, by the system, a plurality of network test policies to a plurality of remote devices, each network test policy at a remote device comprising network test instructions for the remote device to issue network tests and report network test results by periodically issuing network tests to the plurality of remote devices.

6. The method of claim 1, where receiving the first network test result report comprises receiving information specifying a first network component in the first specified network path that was successfully reached by the first remote device attempt to access the first network resource.

7. The method of claim 6, where issuing the command to at least the second remote device comprises instructing the second remote device to issue a second network test along a second specified network path which overlaps with the first specified network path at the first network component.

8. An information handling system comprising:
one or more processors;
a memory coupled to at least one of the processors;
a set of instructions stored in the memory and executed by at least one of the processors to proactively diagnose a network fault in a distributed computer network, wherein the set of instructions are executable to perform actions of:

receiving, by the system, a first network test result report from a first remote device which attempts to access a first network resource over a first specified network path, where the first network test result report identifies a first network issue with information identifying a first resource request to the first remote device, a received response from the first remote device, and information identifying one or more neighboring network components through which the first resource request was sent;

issuing, by the system, a command to at least a second remote device in response to the first network issue identified in the first network test result report, where the command instructs at least the second remote device to issue a network test for evaluating at least part of the first specified network path and report network verification test results pursuant to a network test policy stored at the second remote device, where the command is based on network test policies and device selection criteria specifying which remote devices perform what network tests in reaction to a reported network issue; and aggregating, by the system, data from the first network test result report and network verification test results for use in proactively diagnosing the network fault in the first specified network path.

9. The information handling system of claim 8, where the plurality of remote devices comprises a plurality of mobile devices that are managed by a mobile device management platform.

10. The information handling system of claim 8, wherein the set of instructions are executable to generate the plurality of network test policies such that each network test policy distributed to a remote device specifies one or more network tests to be performed by the remote device in terms of network test content and frequency.

11. The information handling system of claim 8, wherein the plurality of remote devices have authorized and secure access to the distributed computer network to issue network tests that can externally evaluate a location of the network fault in the distributed computer network.

12. The information handling system of claim 8, wherein the set of instructions are executable to distribute the plurality of network test policies by periodically issuing network tests to the plurality of remote devices.

13. The information handling system of claim 8, wherein the set of instructions are executable to receive the first network test result report by receiving information specifying a first network component in the first specified network path that was successfully reached by the first remote device attempt to access the first network resource.

14. The information handling system of claim 13, wherein the set of instructions are executable to issue the command to at least the second remote device by instructing the second remote device to issue a second network test along a second specified network path which overlaps with the first specified network path at the first network component.

15. A computer program product stored in a computer readable storage medium, comprising computer instructions that, when executed by an information handling system, causes the system to proactively diagnose a network fault in a distributed computer network by:

receiving, by the system, a first network test result report from a first remote device which attempts to access a first network resource over a first specified network path;

issuing, by the system, a command to at least a second remote device in response to a first network issue identified in the first network test result report, where the command instructs at least the second remote device to issue a network test for evaluating at least part of the first specified network path and report network verification test results pursuant to a network test policy stored at the second remote device, where the command is based on network test policies and device selection criteria specifying which remote devices perform what network tests in reaction to a reported network issue; and aggregating, by the system, data from the first network test result report and network verification test results for use in proactively diagnosing the network fault in the first specified network path.

16. The computer program product of claim 15, further comprising computer instructions that, when executed by the information handling system, causes the system to generate the plurality of network test policies such that each network test policy distributed to a remote device specifies one or more network tests to be performed by the remote device in terms of network test content and frequency.

17. The computer program product of claim 15, where the plurality of remote devices have authorized and secure access to the distributed computer network to issue network tests that can externally evaluate a location of the network fault in the distributed computer network.

18. The computer program product of claim 15, further comprising computer instructions that, when executed by the information handling system, causes the system to distribute the plurality of network test policies by periodically issuing network tests to the plurality of remote devices.

19. The computer program product of claim 15, further comprising computer instructions that, when executed by the information handling system, causes the system to receive the first network test result report by receiving information specifying a first network component in the first specified network path that was successfully reached by the first remote device attempt to access the first network resource.

20. The computer program product of claim 19, further comprising computer instructions that, when executed by the information handling system, causes the system to issue the command to at least the second remote device by instructing the second remote device to issue a second network test along a second specified network path which overlaps with the first specified network path at the first network component.

* * * * *